(12) United States Patent
Huang

(10) Patent No.: US 10,062,339 B2
(45) Date of Patent: Aug. 28, 2018

(54) DATA SIGNAL DRIVING METHOD, DRIVING DEVICE AND LIQUID CRYSTAL DISPLAY DEVICE

(71) Applicant: Shenzhen China Star Optoelectronics Technology Co., Ltd., Shenzhen, Guangdong (CN)

(72) Inventor: Xiaoyu Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 114 days.

(21) Appl. No.: 15/309,747

(22) PCT Filed: Aug. 3, 2016

(86) PCT No.: PCT/CN2016/093127
§ 371 (c)(1),
(2) Date: Nov. 8, 2016

(87) PCT Pub. No.: WO2018/014375
PCT Pub. Date: Jan. 25, 2018

(65) Prior Publication Data
US 2018/0151133 A1    May 31, 2018

(30) Foreign Application Priority Data
Jul. 20, 2016  (CN) .......................... 2016 1 2574601

(51) Int. Cl.
*G09G 3/36* (2006.01)
*G02F 1/1362* (2006.01)

(52) U.S. Cl.
CPC ......... *G09G 3/36* (2013.01); *G02F 1/136286* (2013.01); *G09G 2310/0264* (2013.01)

(58) Field of Classification Search
CPC .............. G09G 3/36; G09G 2310/0264; G02F 1/136286
See application file for complete search history.

*Primary Examiner* — Charles Hicks
(74) *Attorney, Agent, or Firm* — Andrew C. Cheng

(57) ABSTRACT

The data signal driving method is disclosed. The method is applied in a display panel. The display panel includes a display region having data lines and a fan-out region having connection lines. The method includes: inputting a reference voltage to each connection lines and obtaining a current in each connection line; setting a most middle connection line as a first connection line, using the first connection line as a reference, respectively calculating and obtaining resistances of a 2nd to a N-th connection lines; inputting a data signal voltage to the connection lines; and inputting a compensation voltage to each of the 2nd to the N-th connection lines according to the data signal voltage and the resistances such that after applying the data signal voltage and the compensation voltages, the current in each connection line is equal; wherein, N is an integer greater than 2. A driving device is also disclosed.

15 Claims, 2 Drawing Sheets

DATA SIGNAL DRIVING METHOD, DRIVING DEVICE AND LIQUID CRYSTAL DISPLAY DEVICE

BACKGROUND OF THE INVENTION

1. Field of the Invention

The present invention relates to the display technology field, and more particularly to a data signal driving method, driving device and liquid crystal display device.

2. Description of Related Art

A Liquid Crystal Display (LCD) is a flat and ultrathin display device, and the LCD is formed by a certain number of color or black-white pixels, and being placed in front of a light source or a reflective surface. The power consumption of the liquid crystal display device is low, and having features of high picture quality, small size, light weight such that the LCD is favored by everyone and becomes a mainstream of the display device. Currently, a liquid crystal display device is mainly based on a Thin Film Transistor (TFT) liquid crystal display device, and a liquid crystal panel is a main part of the liquid crystal display device. The liquid crystal generally includes a color filter substrate and a TFT array substrate which are disposed oppositely and a liquid crystal layer clamped between the two substrates.

The driving the display panel utilizes gate driving device and data driving device to respectively provide a scanning signal and a data signal to each sub-pixel in the display panel, the voltage difference among different data signal voltages and a common electrode voltage cause different rotation angles of liquid crystal molecules in order to form brightness differences. That is, a display of the liquid crystal panel forms different grayscale levels. The display panel includes a display region and a fan-out region. The display region is provided with data lines, and the fan-out region is provided with connection lines, the data lines and the connection lines are connected respectively. The data signals provided by the data driving device are inputted to the data lines to charge the pixels through the connection lines in the fan-out region.

In the display panel design, the impedance of the connection lines at edges of the fan-out region is different from the impedance of the connection lines at a middle portion of the fan-out region. Because the impedance difference of the fan-out region is too large, voltage drop of the data signal voltages on the connection lines are different such that the data signal voltages inputted to the data lines are inconsistent so that when the display panel is displaying, a middle portion and two side portions of the display panel generate a difference to generate a color shift with color mixing or bright spots so as to decrease the display quality and decrease the display quality of the display panel.

SUMMARY OF THE INVENTION

In view of the shortage of the conventional art, the present invention provides a data signal driving method and a driving device, based on the resistance differences among the connection lines of the fan-out region, inputting a compensation voltage to each connection line such that when the data signal voltage is inputted to the data lines, the data signal voltage tends to be consistent in order to improve the display quality of the display panel.

In order to achieve the above purpose, the present invention adopts the following technology solutions:

A data signal driving method, applied in a display panel, wherein, the display panel includes a display region and a fan-out region, the display region is provided with data lines, the fan-out region is provided with connection lines, the connection lines and the data lines are connected respectively, and the method comprises steps of:

inputting a reference voltage to each of the connection lines, and obtaining a current in each of the connection lines;

setting a most middle connection line in the fan-out region as a first connection line, using the first connection line as a reference, setting a resistance value of the first connection line to be zero, based on a current calculation formula of the connection lines, and using the reference voltage as an intermediate equivalent for an equivalent substitution to respectively calculate and obtain resistances of a 2nd to a N-th connection lines;

inputting a data signal voltage to each connection line; and inputting a compensation voltage to each of the 2nd connection line to the N-th connection line according to the data signal voltages and the resistances of the 2nd to the N-th connection lines such that after applying the data signal voltages and the compensation voltages, the current in each of the connection lines is equal;

wherein, the N-th connection line is the outermost connection line in the fan-out region, and N is an integer greater than 2.

Wherein, the step of obtaining resistances of a 2nd to a N-th connection lines comprises: inputting a reference voltage Vs to each of the connection lines, obtaining a current $I_{10}$ of the first connection line as $$I_{10} = \frac{V_S}{R_{F1} + R_D}; \quad (1\text{-}1)$$

obtaining a current $I_{n0}$ of the n-th connection line as $$I_{n0} = \frac{V_S}{R_{Fn} + R_D}, \quad (1\text{-}2)$$

wherein, $R_{F1}$ represents a resistance of the first connection line, $R_{Fn}$ represents a resistance of the n-th connection line, and $R_D$ represents a resistance of each data line; and based on the formulas (1-1) and (1-2), setting $R_{F1}$ to be 0, and using the reference voltage Vs as an intermediate equivalent in order to obtain a formula:

$$R_{Fn} = \left(\frac{I_{10}}{I_{n0}} - 1\right) R_D; \quad (1\text{-}3)$$

wherein, n=2, 3, . . . , N−1, N.

Wherein, the compensation voltages of the 2nd connection line to the N-th connection line are obtained by steps of: inputting a data signal voltage $V_d$ to each connection line, inputting a compensation voltage $V_{xn}$ to the n-th connection line; at this time, a current $I_{11}$ of the first connection line is:

$$I_{11} = \frac{V_d}{R_{F1} + R_D}, \quad (2\text{-}1)$$

a current $I_{n1}$ of the n-th connection line is:

$$I_{n1} = \frac{V_d + V_{xn}}{R_{Fn} + R_D}; \quad (2\text{-}2)$$

according to the formulas (2-1) and (2-2), setting the currents to be $I_{11}=I_{n1}$, and setting the value of $R_{F1}$ to be 0, obtaining $$V_{xn} = \frac{V_d R_{Fn}}{R_D}; \quad (2\text{-}3)$$

substituting the formula (1-3) into the formula (2-3), obtaining that the compensation voltage $V_{xn}$ inputted at the n-th connection line is:

$$V_{xn} = V_d\left(\frac{I_{10}}{I_{n0}} - 1\right). \quad (2\text{-}4)$$

Wherein, the step of obtaining resistances of a 2nd to a N-th connection lines comprises: inputting a reference voltage Vs to each of the connection lines, obtaining a current $I_{10}$ of the first connection line as $$I_{10} = \frac{V_S}{R_{F1} + R_D}; \quad (3\text{-}1)$$

obtaining a current $I_{N0}$ of the N-th connection line as $$I_{N0} = \frac{V_S}{R_{FN} + R_D}, \quad (3\text{-}2)$$

wherein, $R_{F1}$ represents a resistance of the first connection line, $R_{FN}$ represents a resistance of the N-th connection line, and $R_D$ represents a resistance of each data line; and based on the formulas (3-1) and (3-2), setting $R_{F1}$ to be 0, and using the reference voltage Vs as an intermediate equivalent in order to obtain a formula:

$$R_{FN} = \left(\frac{I_{10}}{I_{N0}} - 1\right)R_D; \quad (3\text{-}3)$$

according to a following formula (3-4) to calculate a resistance $R_{Fn}$ of the n-th connection line:

$$R_{Fn} = \frac{n}{N}R_{FN} = \frac{n}{N}\left(\frac{I_{10}}{I_{N0}} - 1\right)R_D, \quad (3\text{-}4)$$

wherein, n=2, 3, . . . , N-1, N.

Wherein, the compensation voltages of the 2nd connection line to the N-th connection line are obtained by steps of: inputting a data signal voltage $V_d$ to each connection line, inputting a compensation voltage $V_{xn}$ to the n-th connection line; at this time, a current $I_{11}$ of the first connection line is:

$$I_{11} = \frac{V_d}{R_{F1} + R_D}, \quad (4\text{-}1)$$

a current $I_{n1}$ of the n-th connection line is:

$$I_{n1} = \frac{V_d + V_{xn}}{R_{Fn} + R_D}; \quad (4\text{-}2)$$

according to the formulas (4-1) and (4-2), setting the currents to be $I_{11}=I_{n1}$, and setting the value of $R_{F1}$ to be 0, obtaining $$V_{xn} = \frac{V_d R_{Fn}}{R_D}; \quad (4\text{-}3)$$

substituting the formula (3-4) into the formula (4-3), obtaining the compensation voltage $V_{xn}$ inputted at the n-th connection line is:

$$V_{xn} = V_d\left(\frac{I_{10}}{I_{n0}} - 1\right). \quad (4\text{-}4)$$

Another aspect of the present invention provides a data signal driving device, used for providing a data signal t a display panel, wherein, the display panel includes a display region and a fan-out region, the display region is provided with data lines, the fan-out region is provided with connection lines, the connection lines and the data lines are connected respectively, setting a most middle connection line in the fan-out region as a first connection line, a outermost connection line in the fan-out region as a N-th connection line, and the data signal driving device comprises: a data signal driver, used for inputting a reference voltage or a data signal voltage to each of the connection lines; a current obtaining module, used for obtaining a current in each of the connection lines; a resistance calculation module, used for using the first connection line as a reference, setting a resistance value of the first connection line to be zero, based on a current calculation formula of the connection lines, and using the reference voltage as an intermediate equivalent for an equivalent substitution to respectively calculate and obtain resistances of a 2nd to a N-th connection lines; a voltage compensation module, used for inputting a compensation voltage to each of the 2nd connection line to the N-th connection line according to the data signal voltages and the resistances of the 2nd to the N-th connection lines such that after applying the data signal voltages and the compensation voltages, the current in each of the connection lines is equal; wherein, N is an integer greater than 2.

Wherein, a process that the resistance calculation module calculates the resistances of the 2nd to the N-th connection lines comprises: when the data signal driving device is started for the first time, the data signal driving device inputs a reference voltage Vs to each of the connection lines, the current obtaining module obtains a current ho of the first connection line as $$I_{10} = \frac{V_S}{R_{F1} + R_D}; \quad (1\text{-}1)$$

obtaining a current $I_{n0}$ of the n-th connection line as $$I_{n0} = \frac{V_S}{R_{Fn} + R_D}, \quad (1\text{-}2)$$

wherein, $R_{F1}$ represents a resistance of the first connection line, $R_{Fn}$ represents a resistance of the n-th connection line, and $R_D$ represents a resistance of each data line; and the resistance calculation module depends on the formulas (1-1) and (1-2), set $R_{F1}$ to be 0, and uses the reference voltage Vs as an intermediate equivalent in order to obtain a formula:

$$R_{Fn} = \left(\frac{I_{10}}{I_{n0}} - 1\right) R_D; \quad (1\text{-}3)$$

wherein, n=2, 3, . . . , N−1, N.

Wherein, a determination method of the compensation voltages inputted by the voltage compensation module to the 2nd to the N-th connection lines comprises: when the data signal driving device operates normally, the data signal driving device inputs a data signal voltage $V_d$ to each connection line, sets the voltage compensation module to input a compensation voltage $V_{xn}$ to the n-th connection line; at this time, a current $I_{11}$ of the first connection line is:

$$I_{11} = \frac{V_d}{R_{F1} + R_D}, \quad (2\text{-}1)$$

a current $I_{n1}$ of the n-th connection line is:

$$I_{n1} = \frac{V_d + V_{xn}}{R_{Fn} + R_D}; \quad (2\text{-}2)$$

according to the formulas (2-1) and (2-2), setting the currents to be $I_{11}=I_{n1}$, and setting the value of $R_{F1}$ to be 0, obtaining $$V_{xn} = \frac{V_d R_{Fn}}{R_D}; \quad (2\text{-}3)$$

substituting the formula (1-3) into the formula (2-3), obtaining that the compensation voltage $V_{xn}$ inputted at the n-th connection line is:

$$V_{xn} = V_d \left(\frac{I_{10}}{I_{n0}} - 1\right). \quad (2\text{-}4)$$

Wherein, a process that the resistance calculation module obtains resistances of the 2nd to the N-th connection lines comprises: when the data signal driving device is started for the first time, the data signal driving device inputs a reference voltage Vs to each of the connection lines, obtaining a current $I_{10}$ of the first connection line as $$I_{10} = \frac{V_S}{R_{F1} + R_D}; \quad (3\text{-}1)$$

the current obtaining module obtains a current $I_{N0}$ of the N-th connection line as $$I_{N0} = \frac{V_S}{R_{FN} + R_D}, \quad (3\text{-}2)$$

wherein, $R_{F1}$ represents a resistance of the first connection line, $R_{FN}$ represents a resistance of the N-th connection line, and $R_D$ represents a resistance of each data line; and the resistance calculation module depends on the formulas (3-1) and (3-2), set $R_{F1}$ to be 0, uses the reference voltage Vs as an intermediate equivalent in order to obtain a formula:

$$R_{FN} = \left(\frac{I_{10}}{I_{N0}} - 1\right) R_D, \quad (3\text{-}3)$$

and depends on a following formula (3-4) to calculate a resistance $R_{Fn}$ of the n-th connection line:

$$R_{Fn} = \frac{n}{N} R_{FN} = \frac{n}{N} \left(\frac{I_{10}}{I_{N0}} - 1\right) R_D, \quad (3\text{-}4)$$

wherein, n=2, 3, . . . , N−1, N.

Wherein, a determination method of the compensation voltages inputted by the voltage compensation module to the 2nd to the N-th connection lines comprises: when the data signal driving device operates normally, the data signal driving device inputs a data signal voltage $V_d$ to each connection line, sets the voltage compensation module to input a compensation voltage $V_{xn}$ to the n-th connection line; at this time, a current $I_{11}$ of the first connection line is:

$$I_{11} = \frac{V_d}{R_{F1} + R_D}, \quad (4\text{-}1)$$

a current $I_{n1}$ of the n-th connection line is:

$$I_{n1} = \frac{V_d + V_{xn}}{R_{Fn} + R_D}; \quad (4\text{-}2)$$

according to the formulas (4-1) and (4-2), setting the currents to be $I_{11}=I_{n1}$, and setting the value of $R_{F1}$ to be 0, obtaining $$V_{xn} = \frac{V_d R_{Fn}}{R_D}; \quad (4\text{-}3)$$

substituting the formula (3-4) into the formula (4-3), obtaining the compensation voltage $V_{xn}$ inputted at the n-th connection line is:

$$V_{xn} = V_d \left(\frac{I_{10}}{I_{n0}} - 1\right). \quad (4\text{-}4)$$

The data signal driving method and the driving device provided by the present invention, according to the reference voltage to obtain the resistance of each connection line in the fan-out region, based on the resistance differences among the connection lines of the fan-out region, inputting a compensation voltage to each connection line such that when the data signal voltage is inputted to the data lines, the data signal voltage tends to be consistent in order to improve the display quality of the display panel.

DETAILED DESCRIPTION OF THE PREFERRED EMBODIMENT

Figure 1:
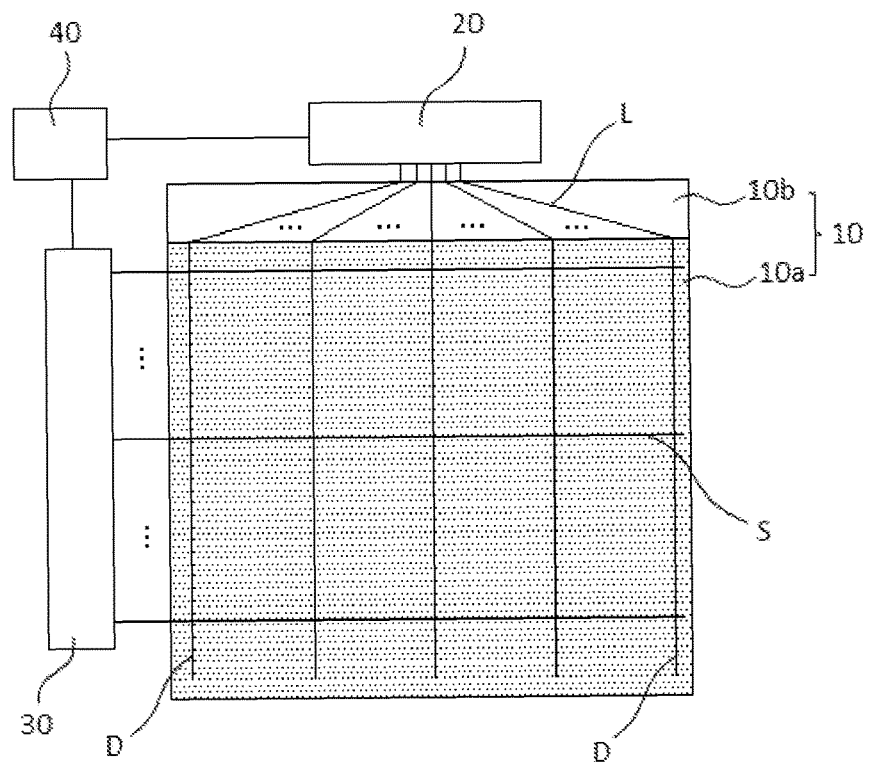
FIG. 1 is a schematic structural diagram of a liquid crystal display device provided by the embodiment of the present invention.

In order to let the purpose, the technology solution and features of the present invention to be clearer, the following content combines the drawings for illustrating the specific embodiment of the present invention in detail. The example of the preferred embodiment is illustrated in the drawings. The embodiments of the present invention described in the drawings are only exemplary, and the present invention is not limited to the embodiments.

Here, it should be noted that in order to avoid obscuring the present disclosure because of unnecessary detail, the figures only show structure and/or processing steps that are closely related according to the present solution, and the other details that are not related to the present disclosure is omitted.

The present embodiment provides a liquid crystal display device, as shown in FIG. 1, the liquid crystal display device includes a display panel 10, a data signal driving device 20, a gate signal driving device 30 and a timing controller 40. Wherein, the timing controller 40 is used for providing a timing control signal to the data signal driving device 20 and the gate signal driving device 30, and sending an image signal waited to be displayed to the data signal driving device 20. The data signal driving device 20 generates a corresponding data signal to the display panel 10 according to the timing control signal and the image signal waited to be displayed which are received from the timing controller 40. The gate signal driving device 30 generates a corresponding scanning signal to the display panel 10 according to the timing control signal received from the timing controller 40.

Wherein, the display panel 10 includes a display region 10a and a fan-out region 10b. The display region 10a is provided with multiple data lines D and multiple scanning lines S which are disposed vertically and horizontally. Sub-pixels (not shown in the figure) are formed at intersection regions of the data lines D and the scanning lines S. Connection lines L are disposed in the fan-out region 10b, the connection lines L and the data lines D are connected respectively to each other, the data signal provided by the data driving device 20 charges the sub-pixel through inputting to the data line D by passing through the connection line L in the fan-out region 10b.

Figure 2:
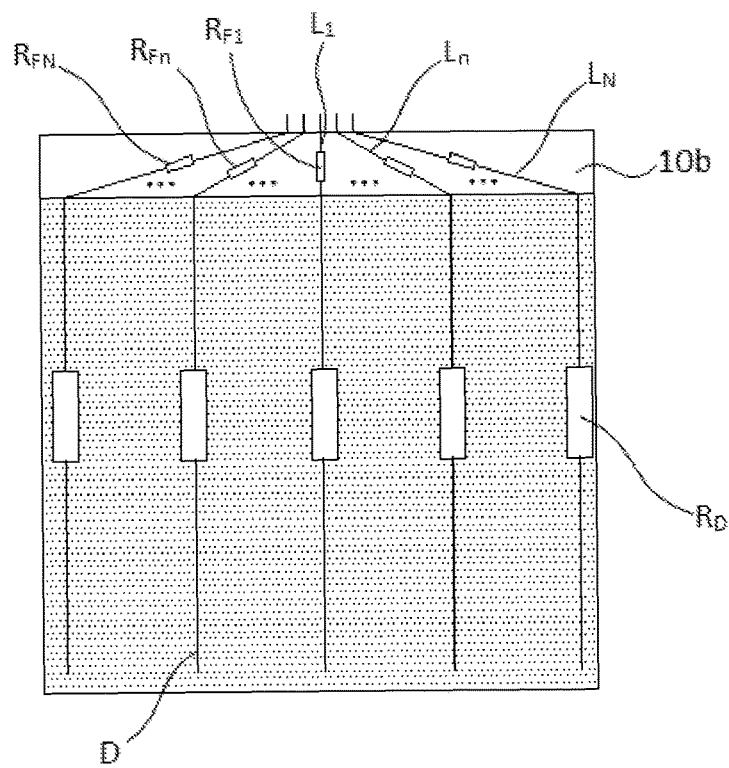
FIG. 2 is an equivalent circuit diagram showing that connection lines and data lines are connected respectively to each other.

Wherein, as the equivalent circuit diagram shown in FIG. 2, defining that the most middle connection line in the fan-out region 10b as a first connection line $L_1$. From the first connection line $L_1$, and facing toward two side edges, n-th connection lines $L_n$ are respectively and sequentially provided. Wherein, n=2, 3, ..., N−1, N, and N is an integral greater than 2 When n=N, the N-th connection line N $L_N$ is the outermost connection line in the fan-out region 10b. Furthermore, as shown in FIG. 2, a resistor $R_{F1}$ represents a resistance of the first connection line $L_1$, $R_{Fn}$ represents a resistance of the n-th connection line $L_n$, $R_{FN}$ represents a resistance of a N-th connection line, and $R_D$ represents a resistance of each data line. Because lengths of connection lines are different, the resistances $R_{F1} \sim R_{Fn} \sim R_{FN}$ are not equal to each other. In the present invention, when calculating the resistance, using the resistance of the first connection line $L_1$ as a reference. Therefore, in the following calculation formula, the resistance value of the resistor $R_{F1}$ is zero.

Figure 3:
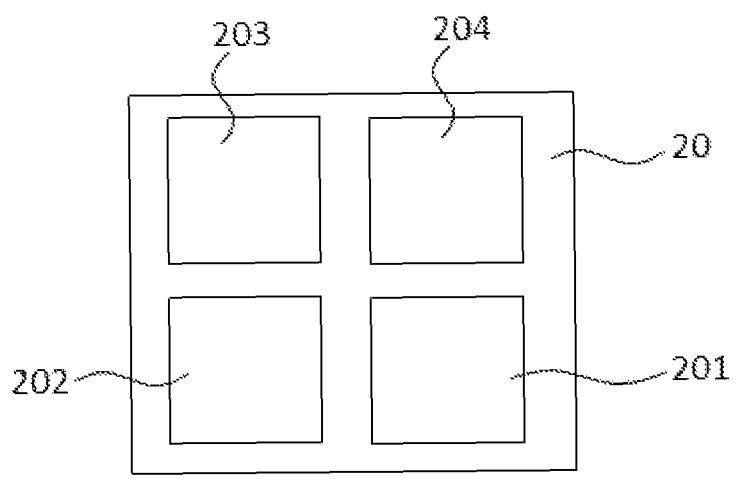
FIG. 3 is a schematic structural diagram of a data signal driving device provided by the embodiment of the present invention.

In order to solve the inconsistent lengths of the connection lines L in the fan-out region 10b that generates a color shift with color mixing or bright spots, the present invention provides a data signal driving device and a corresponding driving method. As shown in FIG. 3, the data signal driving device 20 includes a data signal driver 201, a current obtaining module 202, a resistance calculation module 203 and a voltage compensation module 204.

Wherein, the data signal driver 201 is mainly used for inputting a data signal voltage to each connection line L in order to realize providing a data signal to the display panel 10. The current obtaining module 202 is used for obtaining a current in each connection line L. The resistance calculation module 203 calculates the resistance of each connection line L according to the current obtaining module 202. The voltage compensation module 204 is used for inputting a compensation voltage to each of the 2nd to the N-th connection lines such that after applying the data signal voltages and the compensation voltages, a current of each connection line is equal.

Wherein, the data signal driving device 201 is realized through a Chip On Film (COF) structure. The current obtaining module 202, the resistance calculation module 203 and the voltage compensation module 204 can be disposed in a same COF chip or be individually disposed at another printed circuit board.

The following content combines FIG. 2 and FIG. 3 to introduce the driving method of the data signal driving device 20 in detail, the driving method specifically includes:

(1) inputting a reference voltage to each of the connection lines, and obtaining a current in each of the connection lines. Specifically, when the data signal driving device 20 is started for the first time, the data signal driver 201 inputs a reference voltage Vs to each of the connection lines. The current obtaining module 202 obtains a current $I_{10}$ of the first connection line $L_1$, and $$I_{10} = \frac{V_S}{R_{F1} + R_D}; \qquad (1\text{-}1)$$

obtaining a current $I_{n0}$ of the n-th connection line $L_n$, and $$I_{n0} = \frac{V_S}{R_{Fn} + R_D}. \qquad (1\text{-}2)$$

(2) based on a current calculation formula of the connection lines, and using the reference voltage as an intermediate equivalent for an equivalent substitution to respectively calculate and obtain resistances of 2nd to N-th connection lines. Specifically, the resistance calculation module 203 is based on the formulas (1-1) and (1-2), setting $R_{F1}$ to be 0, and using the reference voltage Vs as the intermediate equivalent in order to obtain a formula:

$$R_{Fn} = \left(\frac{I_{10}}{I_{n0}} - 1\right)R_D. \tag{1-3}$$

Wherein, the values of n are sequentially 2, 3, ..., N−1, N, and calculating sequentially to obtain the resistances of the 2nd to N-th connection lines.

(3) inputting a data signal voltage to each of the connection lines. Specifically, when the data signal driving device 20 operates normally, the data signal driver 201 inputs a data signal voltage $V_d$ to each of the connection lines L.

(4) inputting a compensation voltage to each of the 2nd connection line to N-th connection line according to the data signal voltages and the resistances of 2nd to N-th connection lines. Specifically, the voltage compensation module 204 inputs a compensation voltage $V_{xn}$ to the n-th connection line such that after applying the data signal voltage $V_d$ and the compensation voltage $V_{xn}$, a current of each connection line is equal. The determination method of the compensation voltage $V_{xn}$ includes:

After applying the data signal voltage $V_d$ and the compensation voltage $V_{xn}$, the current $I_{11}$ of the first connection line $L_1$ is:

$$I_{11} = \frac{V_d}{R_{F1} + R_D}; \tag{2-1}$$

the current $I_{n1}$ of the n-th connection line $L_n$ is:

$$I_{n1} = \frac{V_d + V_{xn}}{R_{Fn} + R_D}; \tag{2-2}$$

according to the formulas (2-1) and (2-2), setting the currents to be $I_{11}=I_{n1}$, and setting the value of $R_{F1}$ to be 0, obtaining $$V_{xn} = \frac{V_d R_{Fn}}{R_D}; \tag{2-3}$$

Substituting the formula (1-3) into the formula (2-3), obtaining that the compensation voltage $V_{xn}$ inputted at the n-th connection line is:

$$V_{xn} = V_d\left(\frac{I_{10}}{I_{n0}} - 1\right). \tag{2-4}$$

Accordingly, the voltage compensation module 204 inputs the compensation voltage $V_{xn}$ to the n-th connection line $L_n$ according to a calculation result based on the formula (2-4) such that after applying the data signal voltage $V_d$ and the compensation voltage $V_{xn}$, the current of each connection line is equal.

In another embodiment, the driving method of the data signal driving device 20 can further depend in the following method:

(1) inputting a reference voltage to each of the connection lines, and obtaining a current in each of the connection lines. Specifically, when the data signal driving device 20 is started for the first time, the data signal driver 201 inputs a reference voltage Vs to each of the connection lines. The current obtaining module 202 obtains a current $I_{10}$ of the first connection line $L_1$, and $$I_{10} = \frac{V_S}{R_{F1} + R_D}; \tag{3-1}$$

obtaining a current $I_{N0}$ of the N-th connection line $L_N$, and $$I_{N0} = \frac{V_S}{R_{FN} + R_D}. \tag{3-2}$$

(2) According to the current calculation formula of each connection line, and using the reference voltage as an intermediate equivalent for an equivalent substitution to respectively calculate and obtain resistances of 2nd to N-th connection lines. Specifically, the resistance calculation module 203 is based on the formula (3-1) and (3-2), setting $R_{F1}$ to be 0, and using the reference voltage Vs as the intermediate equivalent in order to obtain a formula:

$$R_{FN} = \left(\frac{I_{10}}{I_{N0}} - 1\right)R_D. \tag{3-3}$$

Then, based on the following formula (3-4) to calculate the resistance $R_{Fn}$ of the n-th connection line $$R_{Fn} = \frac{n}{N}R_{FN} = \frac{n}{N}\left(\frac{I_{10}}{I_{N0}} - 1\right)R_D; \tag{3-4}$$

Wherein, n=2, 3, ..., N−1, N. The method is mainly adopted when an area of the display panel is smaller, and the number of the connection lines L is less.

(3) inputting a data signal voltage to each of the connection lines. Specifically, when the data signal driving device 20 operates normally, the data signal driver 201 inputs a data signal voltage $V_d$ to each of the connection lines L.

(4) inputting a compensation voltage to each of the 2nd connection line to N-th connection line according to the data signal voltages and the resistances of 2nd to N-th connection lines. Specifically, the voltage compensation module 204 inputs a compensation voltage $V_{xn}$ to the n-th connection line such that after applying the data signal voltage $V_d$ and the compensation voltage $V_{xn}$, a current of each connection line is equal. The determination method of the compensation voltage $V_{xn}$ includes:

After applying the data signal voltage $V_d$ and the compensation voltage $V_{xn}$, the current $I_{11}$ of the first connection line $L_1$ is:

$$I_{11} = \frac{V_d}{R_{F1} + R_D}; \tag{4-1}$$

the current $I_{n1}$ of the n-th connection line $L_n$ is:

$$I_{n1} = \frac{V_d + V_{xn}}{R_{Fn} + R_D};\qquad(4\text{-}2)$$

according to the formulas (4-1) and (4-2), setting the currents to be $I_{11}=I_{n1}$, and setting the value of $R_{F1}$ to be 0, obtaining $$V_{xn} = \frac{V_d R_{Fn}}{R_D};\qquad(4\text{-}3)$$

Substituting the formula (3-4) into the formula (4-3), obtaining that the compensation voltage $V_{xn}$ inputted at the n-th connection line is:

$$V_{xn} = \frac{nV_d}{N}\left(\frac{I_{10}}{I_{N0}} - 1\right).\qquad(4\text{-}4)$$

Accordingly, the voltage compensation module 204 inputs the compensation voltage $V_{xn}$ to the n-th connection line $L_n$ according to a calculation result based on the formula (4-4) such that after applying the data signal voltage $V_d$ and the compensation voltage $V_{xn}$, the current of each connection line is equal.

In summary, the data signal driving method and the driving device provided by the present invention, according to the reference voltage to obtain the resistance of each connection line in the fan-out region, based on the resistance differences among the connection lines of the fan-out region, inputting a compensation voltage to each connection line such that when the data signal voltage is inputted to the data lines, the data signal voltage tends to be consistent in order to improve the display quality of the display panel.

It should be noted that, herein, relational terms such as first and second, and the like are only used to distinguish one entity or operation from another entity or operation. It is not required or implied that these entities or operations exist any such relationship or order between them. Moreover, the terms "comprise," include," or any other variation thereof, are intended to cover a non-exclusive inclusion, such that a series of elements including the process, method, article or device that includes not only those elements but also other elements not expressly listed or further comprising such process, method, article or device inherent elements. Without more constraints, by the statement "comprises one . . . " element defined does not exclude the existence of additional identical elements in the process, method, article, or apparatus.

The above embodiment does not constitute a limitation of the scope of protection of the present technology solution. Any modifications, equivalent replacements and improvements based on the spirit and principles of the above embodiments should also be included in the protection scope of the present technology solution.

What is claimed is:

1. A data signal driving method, applied in a display panel, wherein, the display panel includes a display region and a fan-out region, the display region is provided with data lines, the fan-out region is provided with connection lines, the connection lines and the data lines are connected respectively, and the method comprises steps of:

inputting a reference voltage to each of the connection lines, and obtaining a current in each of the connection lines;

setting a most middle connection line in the fan-out region as a first connection line, using the first connection line as a reference, setting a resistance value of the first connection line to be zero, based on a current calculation formula of the connection lines, and using the reference voltage as an intermediate equivalent for an equivalent substitution to respectively calculate and obtain resistances of a 2nd to a N-th connection lines;

inputting a data signal voltage to each connection line; and inputting a compensation voltage to each of the 2nd connection line to the N-th connection line according to the data signal voltage and the resistances of the 2nd to the N-th connection lines such that after applying the data signal voltage and the compensation voltages, the current in each of the connection lines is equal;

wherein, the N-th connection line is the outermost connection line in the fan-out region, and N is an integer greater than 2.

2. The data signal driving method according to claim 1, wherein, the step of obtaining resistances of a 2nd to a N-th connection lines comprises:

inputting a reference voltage Vs to each of the connection lines, obtaining a current $I_{10}$ of the first connection line as $$I_{10} = \frac{V_S}{R_{F1} + R_D};\qquad(1\text{-}1)$$

obtaining a current $I_{n0}$ of the n-th connection line as $$I_{n0} = \frac{V_S}{R_{Fn} + R_D},\qquad(1\text{-}2)$$

wherein, $R_{F1}$ represents a resistance of the first connection line, $R_{Fn}$ represents a resistance of the n-th connection line, and $R_D$ represents a resistance of each data line; and based on the formulas (1-1) and (1-2), setting $R_{F1}$ to be 0, and using the reference voltage Vs as an intermediate equivalent in order to obtain a formula:

$$R_{Fn} = \left(\frac{I_{10}}{I_{n0}} - 1\right)R_D;\qquad(1\text{-}3)$$

wherein, n=2, 3, . . . , N−1, N.

3. The data signal driving method according to claim 2, wherein, the compensation voltages of the 2nd connection line to the N-th connection line are obtained by steps of:

inputting a data signal voltage $V_d$ to each connection line, inputting a compensation voltage $V_{xn}$ to the n-th connection line; at this time, a current $I_{11}$ of the first connection line is:

$$I_{11} = \frac{V_d}{R_{F1} + R_D},\qquad(2\text{-}1)$$

a current $I_{n1}$ of the n-th connection line is:

$$I_{n1} = \frac{V_d + V_{xn}}{R_{Fn} + R_D}; \quad (2\text{-}2)$$

according to the formulas (2-1) and (2-2), setting the currents to be $I_{11}=I_{n1}$, and setting the value of $R_{F1}$ to be 0, obtaining $$V_{xn} = \frac{V_d R_{Fn}}{R_D}; \quad (2\text{-}3)$$

substituting the formula (1-3) into the formula (2-3), obtaining that the compensation voltage $V_{xn}$ inputted at the n-th connection line is:

$$V_{xn} = V_d \left( \frac{I_{10}}{I_{n0}} - 1 \right). \quad (2\text{-}4)$$

4. The data signal driving method according to claim 1, wherein, the step of obtaining resistances of a 2nd to a N-th connection lines comprises:
inputting a reference voltage Vs to each of the connection lines, obtaining a current $I_{10}$ of the first connection line as $$I_{10} = \frac{V_S}{R_{F1} + R_D}; \quad (3\text{-}1)$$

obtaining a current $I_{N0}$ of the N-th connection line as $$I_{N0} = \frac{V_S}{R_{FN} + R_D}, \quad (3\text{-}2)$$

wherein, $R_{F1}$ represents a resistance of the first connection line, $R_{FN}$ represents a resistance of the N-th connection line, and $R_D$ represents a resistance of each data line; and
based on the formulas (3-1) and (3-2), setting $R_{F1}$ to be 0, and using the reference voltage Vs as an intermediate equivalent in order to obtain a formula:

$$R_{FN} = \left( \frac{I_{10}}{I_{N0}} - 1 \right) R_D; \quad (3\text{-}3)$$

according to a following formula (3-4) to calculate a resistance $R_{Fn}$ of the n-th connection line:

$$R_{Fn} = \frac{n}{N} R_{FN} = \frac{n}{N} \left( \frac{I_{10}}{I_{N0}} - 1 \right) R_D, \quad (3\text{-}4),$$

wherein, n=2, 3, . . . , N−1, N.

5. The data signal driving method according to claim 4, wherein, the compensation voltages of the 2nd connection line to the N-th connection line are obtained by steps of:
inputting a data signal voltage $V_d$ to each connection line, inputting a compensation voltage $V_{xn}$ to the n-th connection line; at this time, a current $I_{11}$ of the first connection line is:

$$I_{11} = \frac{V_d}{R_{F1} + R_D}, \quad (4\text{-}1)$$

a current $I_{n1}$ of the n-th connection line is:

$$I_{n1} = \frac{V_d + V_{xn}}{R_{Fn} + R_D}; \quad (4\text{-}2)$$

according to the formulas (4-1) and (4-2), setting the currents to be $I_{11}=I_{n1}$, and setting the value of $R_{F1}$ to be 0, obtaining $$V_{xn} = \frac{V_d R_{Fn}}{R_D}; \quad (4\text{-}3)$$

substituting the formula (3-4) into the formula (4-3), obtaining the compensation voltage $V_{xn}$ inputted at the n-th connection line is:

$$V_{xn} = V_d \left( \frac{I_{10}}{I_{n0}} - 1 \right). \quad (4\text{-}4)$$

6. A data signal driving device, used for providing a data signal t a display panel, wherein, the display panel includes a display region and a fan-out region, the display region is provided with data lines, the fan-out region is provided with connection lines, the connection lines and the data lines are connected respectively, setting a most middle connection line in the fan-out region as a first connection line, a outermost connection line in the fan-out region as a N-th connection line, and the data signal driving device comprises:
a data signal driver, used for inputting a reference voltage or a data signal voltage to each of the connection lines;
a current obtaining module, used for obtaining a current in each of the connection lines;
a resistance calculation module, used for using the first connection line as a reference, setting a resistance value of the first connection line to be zero, based on a current calculation formula of the connection lines, and using the reference voltage as an intermediate equivalent for an equivalent substitution to respectively calculate and obtain resistances of a 2nd to a N-th connection lines;
a voltage compensation module, used for inputting a compensation voltage to each of the 2nd connection line to the N-th connection line according to the data signal voltage and the resistances of the 2nd to the N-th connection lines such that after applying the data signal voltage and the compensation voltages, the current in each of the connection lines is equal;
wherein, N is an integer greater than 2.

7. The data signal driving device according to claim 6, wherein, a process that the resistance calculation module calculates the resistances of the 2nd to the N-th connection lines comprises:
when the data signal driving device is started for the first time, the data signal driving device inputs a reference voltage Vs to each of the connection lines, the current obtaining module obtains a current $I_{10}$ of the first connection line as $$I_{10} = \frac{V_S}{R_{F1} + R_D}; \quad (1\text{-}1)$$

obtaining a current $I_{n0}$ of the n-th connection line as $$I_{n0} = \frac{V_S}{R_{Fn} + R_D}; \quad (1\text{-}2)$$

wherein, $R_{F1}$ represents a resistance of the first connection line, $R_{Fn}$ represents a resistance of the n-th connection line, and $R_D$ represents a resistance of each data line; and the resistance calculation module depends on the formulas (1-1) and (1-2), set $R_{F1}$ to be 0, and uses the reference voltage Vs as an intermediate equivalent in order to obtain a formula:

$$R_{Fn} = \left(\frac{I_{10}}{I_{n0}} - 1\right)R_D; \quad (1\text{-}3)$$

wherein, n=2, 3, . . . , N−1, N.

8. The data signal driving device according to claim 7, wherein, a determination method of the compensation voltages inputted by the voltage compensation module to the 2nd to the N-th connection lines comprises:

when the data signal driving device operates normally, the data signal driving device inputs a data signal voltage $V_d$ to each connection line, sets the voltage compensation module to input a compensation voltage $V_{xn}$ to the n-th connection line; at this time, a current $I_{11}$ of the first connection line is:

$$I_{11} = \frac{V_d}{R_{F1} + R_D}, \quad (2\text{-}1)$$

a current $I_{n1}$ of the n-th connection line is:

$$I_{n1} = \frac{V_d + V_{xn}}{R_{Fn} + R_D}; \quad (2\text{-}2)$$

according to the formulas (2-1) and (2-2), setting the currents to be $I_{11}=I_{n1}$, and setting the value of $R_{F1}$ to be 0, obtaining $$V_{xn} = \frac{V_d R_{Fn}}{R_D}; \quad (2\text{-}3)$$

substituting the formula (1-3) into the formula (2-3), obtaining that the compensation voltage $V_{xn}$ inputted at the n-th connection line is:

$$V_{xn} = V_d\left(\frac{I_{10}}{I_{n0}} - 1\right). \quad (2\text{-}4)$$

9. The data signal driving device according to claim 6, wherein, a process that the resistance calculation module obtains resistances of the 2nd to the N-th connection lines comprises:

when the data signal driving device is started for the first time, the data signal driving device inputs a reference voltage Vs to each of the connection lines, obtaining a current $I_{10}$ of the first connection line as $$I_{10} = \frac{V_S}{R_{F1} + R_D}; \quad (3\text{-}1)$$

the current obtaining module obtains a current $I_{N0}$ of the N-th connection line as $$I_{N0} = \frac{V_S}{R_{FN} + R_D}; \quad (3\text{-}2)$$

wherein, $R_{F1}$ represents a resistance of the first connection line, $R_{FN}$ represents a resistance of the N-th connection line, and $R_D$ represents a resistance of each data line; and the resistance calculation module depends on the formulas (3-1) and (3-2), set $R_{F1}$ to be 0, uses the reference voltage Vs as an intermediate equivalent in order to obtain a formula:

$$R_{FN} = \left(\frac{I_{10}}{I_{N0}} - 1\right)R_D, \quad (3\text{-}3)$$

and depends on a following formula (3-4) to calculate a resistance $R_{Fn}$ of the n-th connection line:

$$R_{Fn} = \frac{n}{N}R_{FN} = \frac{n}{N}\left(\frac{I_{10}}{I_{N0}} - 1\right)R_D, \quad (3\text{-}4),$$

wherein, n=2, 3, . . . , N−1, N.

10. The data signal driving device according to claim 9, wherein, a determination method of the compensation voltages inputted by the voltage compensation module to the 2nd to the N-th connection lines comprises:

when the data signal driving device operates normally, the data signal driving device inputs a data signal voltage $V_d$ to each connection line, sets the voltage compensation module to input a compensation voltage $V_{xn}$ to the n-th connection line; at this time, a current $I_{11}$ of the first connection line is:

$$I_{11} = \frac{V_d}{R_{F1} + R_D}, \quad (4\text{-}1)$$

a current $I_{n1}$ of the n-th connection line is:

$$I_{n1} = \frac{V_d + V_{xn}}{R_{Fn} + R_D}; \quad (4\text{-}2)$$

according to the formulas (4-1) and (4-2), setting the currents to be $I_{11}=I_{n1}$, and setting the value of $R_{F1}$ to be 0, obtaining $$V_{xn} = \frac{V_d R_{Fn}}{R_D}; \quad (4\text{-}3)$$

substituting the formula (3-4) into the formula (4-3), obtaining the compensation voltage $V_{xn}$ inputted at the n-th connection line is:

$$V_{xn} = V_d \left( \frac{I_{10}}{I_{n0}} - 1 \right). \quad (4\text{-}4)$$

11. A liquid crystal display device, comprising:
a display panel comprising a display region and a fan-out region, the display region is provided with data lines, the fan-out region is provided with connection lines, the connection lines and the data lines are connected respectively, setting a most middle connection line in the fan-out region as a first connection line, a outermost connection line in the fan-out region as a N-th connection line;
a data signal driving device for providing a data signal to the display panel;
a gate signal driving device for providing a scanning signal to the display panel;
a timing controller for providing a timing control signal to the data signal driving device 20 and the gate signal driving device, and sending an image signal waited to be displayed to the data signal driving device;
wherein, the data signal driving device comprises:
a data signal driver, used for inputting a reference voltage or a data signal voltage to each of the connection lines;
a current obtaining module, used for obtaining a current in each of the connection lines;
a resistance calculation module, used for using the first connection line as a reference, setting a resistance value of the first connection line to be zero, based on a current calculation formula of the connection lines, and using the reference voltage as an intermediate equivalent for an equivalent substitution to respectively calculate and obtain resistances of a 2nd to a N-th connection lines;
a voltage compensation module, used for inputting a compensation voltage to each of the 2nd connection line to the N-th connection line according to the data signal voltage and the resistances of the 2nd to the N-th connection lines such that after applying the data signal voltage and the compensation voltages, the current in each of the connection lines is equal;
wherein, N is an integer greater than 2.

12. The liquid crystal display device according to claim 11, wherein, a process that the resistance calculation module calculates the resistances of the 2nd to the N-th connection lines comprises:
when the data signal driving device is started for the first time, the data signal driving device inputs a reference voltage Vs to each of the connection lines, the current obtaining module obtains a current ho of the first connection line as $$I_{10} = \frac{V_S}{R_{F1} + R_D}; \quad (1\text{-}1)$$

obtaining a current $I_{n0}$ of the n-th connection line as $$I_{n0} = \frac{V_S}{R_{Fn} + R_D}, \quad (1\text{-}2)$$

wherein, $R_{F1}$ represents a resistance of the first connection line, $R_{Fn}$ represents a resistance of the n-th connection line, and $R_D$ represents a resistance of each data line; and
the resistance calculation module depends on the formulas (1-1) and (1-2), set $R_{F1}$ to be 0, and uses the reference voltage Vs as an intermediate equivalent in order to obtain a formula:

$$R_{Fn} = \left( \frac{I_{10}}{I_{n0}} - 1 \right) R_D; \quad (1\text{-}3)$$

wherein, n=2, 3, . . . , N−1, N.

13. The liquid crystal display device according to claim 12, wherein, a determination method of the compensation voltages inputted by the voltage compensation module to the $2^{nd}$ to the N-th connection lines comprises:
when the data signal driving device operates normally, the data signal driving device inputs a data signal voltage $V_d$ to each connection line, sets the voltage compensation module to input a compensation voltage $V_{xn}$ to the n-th connection line; at this time, a current $I_{11}$ of the first connection line is:

$$I_{11} = \frac{V_d}{R_{F1} + R_D}, \quad (2\text{-}1)$$

a current $I_{n1}$ of the n-th connection line is:

$$I_{n1} = \frac{V_d + V_{xn}}{R_{Fn} + R_D}; \quad (2\text{-}2)$$

according to the formulas (2-1) and (2-2), setting the currents to be $I_{11} = I_{n1}$, and setting the value of $R_{F1}$ to be 0, obtaining $$V_{xn} = \frac{V_d R_{Fn}}{R_D}; \quad (2\text{-}3)$$

substituting the formula (1-3) into the formula (2-3), obtaining that the compensation voltage $V_{xn}$ inputted at the n-th connection line is:

$$V_{xn} = V_d \left( \frac{I_{10}}{I_{n0}} - 1 \right). \quad (2\text{-}4)$$

14. The liquid crystal display device according to claim 11, wherein, a process that the resistance calculation module obtains resistances of the 2nd to the N-th connection lines comprises:
when the data signal driving device is started for the first time, the data signal driving device inputs a reference voltage Vs to each of the connection lines, obtaining a current ho of the first connection line as $$I_{10} = \frac{V_S}{R_{F1} + R_D}; \quad (3\text{-}1)$$

the current obtaining module obtains a current $I_{N0}$ of the N-th connection line as $$I_{N0} = \frac{V_S}{R_{FN} + R_D}, \quad (3\text{-}2)$$

wherein, $R_{F1}$ represents a resistance of the first connection line, $R_{FN}$ represents a resistance of the N-th connection line, and $R_D$ represents a resistance of each data line; and the resistance calculation module depends on the formulas (3-1) and (3-2), set $R_{F1}$ to be 0, uses the reference voltage Vs as an intermediate equivalent in order to obtain a formula:

$$R_{FN} = \left(\frac{I_{10}}{I_{N0}} - 1\right) R_D, \quad (3\text{-}3)$$

and depends on a following formula (3-4) to calculate a resistance $R_{Fn}$ of the n-th connection line:

$$R_{Fn} = \frac{n}{N} R_{FN} = \frac{n}{N}\left(\frac{I_{10}}{I_{N0}} - 1\right) R_D, \ldots, \quad (3\text{-}4)$$

wherein, n=2, 3, . . . , N−1, N.

15. The liquid crystal display device according to claim 14, wherein, the determination method of the compensation voltages inputted by the voltage compensation module to the 2nd to the N-th connection lines comprises:

when the data signal driving device operates normally, the data signal driving device inputs a data signal voltage $V_d$ to each connection line, sets the voltage compensation module to input a compensation voltage $V_{xn}$ to the n-th connection line; at this time, a current $I_{11}$ of the first connection line is:

$$I_{11} = \frac{V_d}{R_{F1} + R_D}, \quad (4\text{-}1)$$

a current $I_{n1}$ of the n-th connection line is:

$$I_{n1} = \frac{V_d + V_{xn}}{R_{Fn} + R_D}; \quad (4\text{-}2)$$

according to the formulas (4-1) and (4-2), setting the currents to be $I_{11} = I_{n1}$, and setting the value of $R_{F1}$ to be 0, obtaining $$V_{xn} = \frac{V_d R_{Fn}}{R_D}; \quad (4\text{-}3)$$

substituting the formula (3-4) into the formula (4-3), obtaining the compensation voltage $V_{xn}$ inputted at the n-th connection line is:

$$V_{xn} = V_d\left(\frac{I_{10}}{I_{n0}} - 1\right). \quad (4\text{-}4)$$

* * * * *